US006496716B1

United States Patent
Langer et al.

(10) Patent No.: US 6,496,716 B1
(45) Date of Patent: Dec. 17, 2002

(54) METHOD AND APPARATUS FOR STABILIZATION OF ANGIOGRAPHY IMAGES

(76) Inventors: Anatoly Langer, 340 Riverview Dr., North York, Ontario M4N 3E1 (CA); Normand Robert, 34 Albemarle Ave., Toronto, Ontario M4K 1H7 (CA)

( * ) Notice: Subject to any disclaimer, the term of this patent is extended or adjusted under 35 U.S.C. 154(b) by 0 days.

(21) Appl. No.: 09/502,049

(22) Filed: Feb. 11, 2000

(51) Int. Cl.$^7$ ............................................. A61B 5/00
(52) U.S. Cl. ................. 600/425; 600/428; 382/131; 378/98.2
(58) Field of Search ................................ 600/407, 425, 600/431, 428; 378/98.2, 98.11, 98.12, 62; 382/128, 130, 131

(56) References Cited

U.S. PATENT DOCUMENTS

| | | |
|---|---|---|
| 3,614,736 A | 10/1971 | McLaughlin et al. |
| 3,627,918 A | 12/1971 | Redpath |
| 3,748,644 A | 7/1973 | Tisdale |
| 3,816,722 A | 6/1974 | Sakoe et al. ................ 235/152 |
| 4,164,728 A | 8/1979 | Marsh ........................ 340/146 |
| 4,616,333 A | 10/1986 | Shimoni ..................... 364/819 |
| 4,683,467 A | 7/1987 | Macaulay et al. .......... 340/705 |
| 4,899,393 A | 2/1990 | Morishita et al. ............. 382/6 |
| 4,972,359 A | 11/1990 | Silver et al. ................ 364/728 |
| 5,257,325 A | 10/1993 | Casparian et al. ............ 382/44 |
| 5,293,574 A | 3/1994 | Roehm et al. ................ 378/98 |
| 5,533,085 A * | 7/1996 | Sheehan et al. .............. 378/95 |
| 5,583,954 A | 12/1996 | Garakani .................... 382/278 |
| 5,592,573 A | 1/1997 | Eisenbarth et al. ......... 382/294 |
| 5,809,105 A | 9/1998 | Roehm et al. ................ 378/98 |
| 5,822,391 A * | 10/1998 | Whiting et al. ............ 378/98.2 |
| 5,850,485 A | 12/1998 | Hart .......................... 382/278 |
| 6,226,350 B1 * | 5/2001 | Hsieh ....................... 378/98.2 |

* cited by examiner

*Primary Examiner*—Ruth S. Smith
(74) *Attorney, Agent, or Firm*—Dinesh Agarwal, P.C.

(57) ABSTRACT

A method for stabilizing and optimizing angiogram cine runs. The method for stabilizing involves reducing abrupt motion from the last frame to the first frame by refining the choice of the estimates of first and last frame indices provided by the user and by performing image registration so that a feature of interest is nearly in the same position between the last and first frame. According to another aspect, a network accessible system for storing and playing back angiographic images and presenting patient information is provided. The most diagnostically relevant subset of frames are extracted from selected cine runs and made available over a wide area network (WAN) such as the Internet. The process of identifying a subset of frames encompassing a few cardiac cycles from the most relevant cine runs makes it possible for authorized users to view the images on a web page interface from remote locations like homes or offices using the Internet which otherwise suffers from bandwidth limitations that restricts the amount of data that can be transmitted within a reasonable delay.

35 Claims, 2 Drawing Sheets

METHOD AND APPARATUS FOR STABILIZATION OF ANGIOGRAPHY IMAGES

FIELD OF THE INVENTION

The present invention relates to digital x-ray imaging systems, and in particular to a method for stabilizing and optimizing angiogram cine runs and network accessible system for storing and playing back angiography images.

BACKGROUND OF THE INVENTION

Angiography is a well-known technique that allows real-time detailed visualization, typically in the form of x-ray images, of the cardiac anatomy and function. A typical x-ray angiographic system comprises an x-ray source, an x-ray image intensifier (XRII) and a video camera. The x-ray image intensifier converts the x-ray signal into a light signal which is recorded by a video camera. This technique provides real time video images which, with the injection of a radio-opaque dye, show the motion of the coronary anatomy. The video signal is digitized to yield a series of frames acquired at rates of 15–30 frames/sec. These frames are stored on a hard disk and provide real time playback in the form of a cine angiogram.

In a typical angiographic exam, a large number of images are generated. For example, a single 5 second angiographic cine run generates approximately 16 Megabytes of data (assuming 512x512 pixel images, 1 byte/pixel, 30 frames/s) and a single diagnostic procedure can involve the acquisition of 5–15 angiographic cine runs. Each angiogram cine run in turn comprises a set of 60 to 125 x-ray images with each cine run providing a detailed view of a different aspect of the cardiac anatomy. Known lossless compression techniques can reduce storage requirements by approximately 60%. Excessive storage requirement is the primary reason why angiograms are typically not stored on-line in Picture Archive Capture Systems (PACS) as is done with many other imaging modalities. Instead the angiographic cine run images are archived on portable media like compact disks.

The angiographic cine runs are played back by a cardiologist in the diagnosis of the patient's condition. In a medical clinic, a physician will typically view the entire cine run(s) to observe the arteries or ventricle opacify in response to the dye being injected into the patient and then a few more cardiac cycles are viewed when the arteries are fully opacified followed by the loss of the signal due to the interruption of the dye injection. However, if the angiogram cine run is truncated, then displaying the cine run as a repeating movie loop results in poor visualization due to the mis-registration of features of interest between the last frame and first frame in the looped cine run. Each time cine run loop displays the last frame followed by the first frame, the arteries may appear to move abruptly. As a result, the human visual systems of the examining physician (e.g. cardiologist) loses track of a feature of interest for an amount of time which can be significant relative to the time required to display one or two cardiac cycles.

Abrupt motion of the heart from the last to first frame of the movie loop subset can be the result of a poor choice of the last frame relative to the first frame where the last frame corresponds to a very different phase of the cardiac cycle than the first frame. Abrupt motion from last frame to first frame can also be caused by bulk patient motion. Similarly, motion caused by a patient's breathing together with small amounts of panning which some physicians perform during cine acquisition to reveal structures that are at the edge of the field of view also causes abrupt motion from the last frame to the first frame.

In U.S. Pat. No. 5,293,574 (Roehm et al.), the problem of mis-registration between the last frame and first is avoided by not looping the last frame with the first frame. Instead Roehm discloses showing the frames in temporal order until the last frame of interest is shown and then in reverse temporal order until the first frame of interest is shown and repeating this entire sequence over and over again. While this approach avoids the problem of last frame and first frame registration, it leads to an angiogram cine run where the heart beats conventionally 50% of the time and backwards for the other 50% of the time. It will be appreciated that this does not provide a true rendition of the cardiac physiology.

Accordingly, there remains a need for a method for generating angiogram cine run loops where the problem of mis-registration between the last and first frames is eliminated and a true physiological rendition of the cardiac cycle is provided.

BRIEF SUMMARY OF THE INVENTION

The present invention provides a process for generating and running an angiogram cine run as a continuous movie loop. In another aspect, the present invention also provides a process for extracting a subset of frames from an angiogram cine run and presenting these frames as a movie loop which can displayed continuously.

According to one aspect of the invention, it has been determined that not all the frames in all cine runs generated by an angiographic study are needed to illustrate the salient features of a patient's case. This is because the cine runs constitute a record of a systematic search for pathologies obtained with differing acquisition geometries allowing close scrutiny of all major coronary artery segments to reduce the possibility of overlooking any lesions. The most relevant views are those that best reveal the lesions of interest.

Accordingly, a more manageable subset of the most relevant frames and cine runs are selected from all the cine runs stored for a patient on removable media (e.g. compact disc (CD) media) and made available on-line. Furthermore, because motion is periodic, providing a subset of frames from one cine run spanning one or two cardiac cycles will often suffice. The extraction of subsets of data from angiographic exams allows physicians and patients to view images from a remote location over the Internet where bandwidth limitations would otherwise restrict the amount of data that can be transmitted within a reasonable delay. According to another aspect of the present invention, a server arrangement for angiogram cine runs is provided. The server is network accessible over a local area network or a wide area network, for example over the World Wide Web (WWW) via the Internet.

The process according to the present invention reduces abrupt motion from the last frame to the first frame by refining the choice of the estimates of first and last frame indices provided by the user and performing image registration so that an a feature of interest, e.g. anatomical features such as arteries or ventricles, will be in nearly the same configuration between the last and first frame.

According to this aspect of the invention, the part of the cardiac cycle is selected which best corresponds to the transition from the last to the first frame. Typically, this occurs when there is the least motion (i.e. end systole and end diastole) because the frame rate is limited and it is more likely that a similar heart configuration will be encountered at some later frame when motion is minimized. It has been found that if an attempt is made to match frames in different cycles when motion is rapid there may not exist a pair of frames that closely resemble each other due to the coarse nature of temporal sampling (i.e. frame rate) and the fact that exact timing for the acquisition of the last and front frames cannot be controlled. Furthermore, it is preferable to select the end diastole as opposed to end systole as the first frame because advantageously it is known that the configuration of the heart is more reproducible during this phase.

According to another aspect of the invention, there is provided a network accessible system for storing and playing back angiography images and cine angiograms. The most diagnostically relevant image frames are selected from the angiogram cine runs for each patient and stored on the network accessible system. In addition to the extraction of the diagnostically relevant images, a report including diagrammatic information for each patient is generated. The report describes the case for the patient under diagnosis. The extracted angiogram images, the report and the diagrammatic information for each patient are packaged together (or separately) and may be sent from a remote location either over the phone lines or through a dedicated network connection to a central server in the network accessible system. The central server includes web server computer software for providing secure access via the Internet to the angiographic procedure reports to authorized users (e.g. physicians) at remote locations (e.g. the office for the patient's physician or a teaching hospital). The angiographic procedure report for a patient preferably includes one or more angiogram cine run loops, diagrammatic information and textual information. To facilitate the transmission and storage of the angiogram cine run loops for each patient, preferably the cine run loops comprise the most diagnostically relevant image frames.

In a first aspect, the present invention provides a method for generating a movie loop from a sequence of image frames, the method comprises the steps of: (a) selecting a plurality of image frames from the series wherein the selected image frames define a sequence associated with the internal anatomy; (b) registering a first image frame and a last image frame in the selected image frames; (c) wherein the step of registering the last and the first image frames comprises minimizing differences in a feature of interest appearing in the first and last image frames; and (d) forming a movie loop from the selected image frames and the registered first and last image frames, wherein the movie loop includes intermediate image frames between the first and the last image frames, the intermediate image frames being compensated for differences in the appearance of the feature of interest in the last registered image frame and the first image frame.

In a second aspect, the present invention provides a system for storing angiogram movie loops associated with one or more patients and making the angiogram movie loops available over a network, the system comprises: (a) a memory for storing the angiogram movie loops; (b) a network interface for interfacing the system to the network; (c) a command interface for processing requests from a computer connected to the network and making one or more of the angiogram movie loops available to the requesting computer.

BRIEF DESCRIPTION OF THE DRAWINGS

Reference will now be made, by way of example, to the accompanying figures, which show a preferred embodiment of the present invention, and in which.

DETAILED DESCRIPTION OF THE PREFERRED EMBODIMENTS

Figure 1:
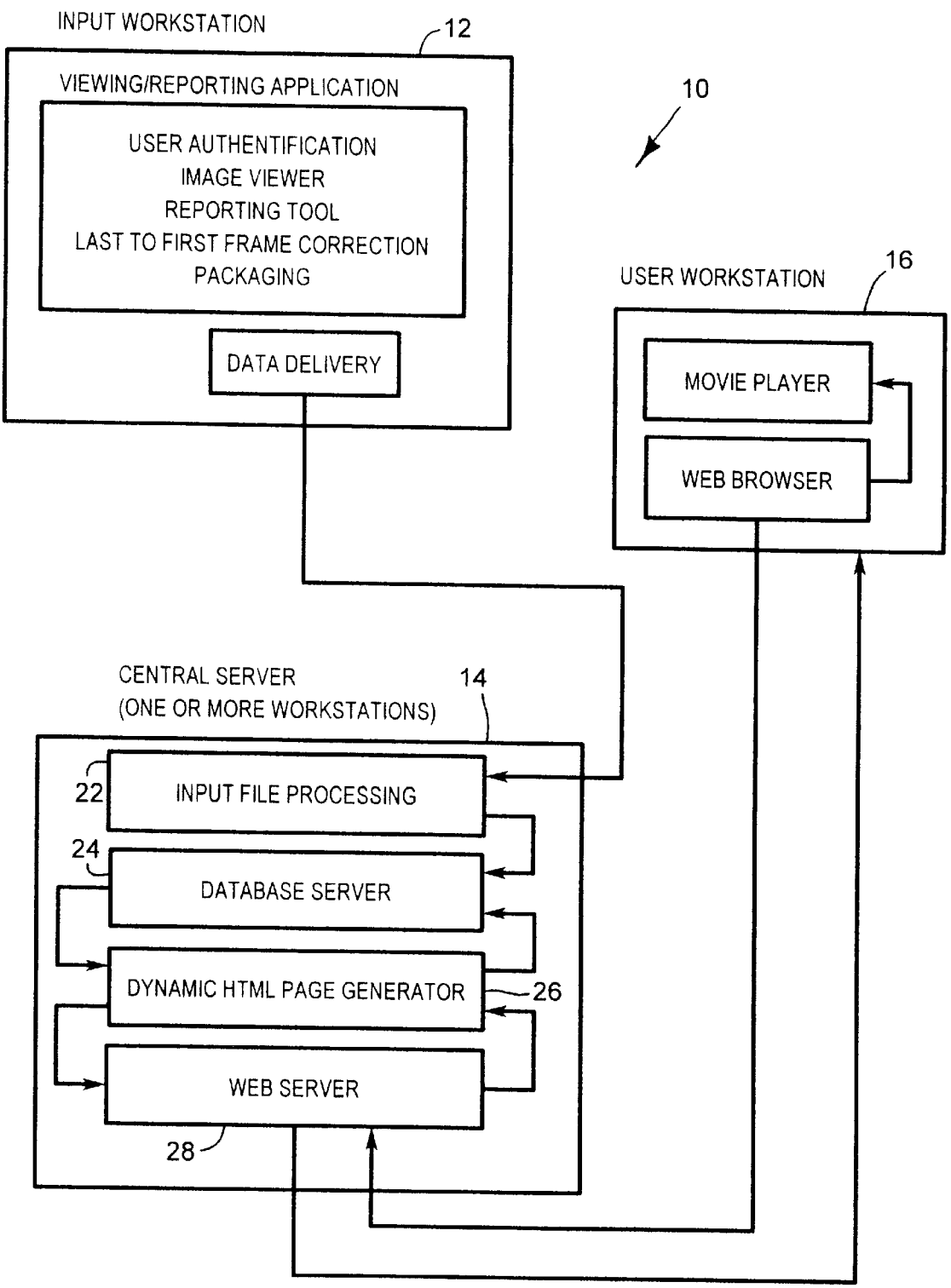
FIG. 1 is a block diagram showing an angiogram cine loop network accessible system according to the present invention.

Reference is first made to FIG. 1 which shows a network accessible system for angiogram cine run or movie loops and other cardiac patient information according to the present invention. The network accessible system is indicated generally by reference 10 and comprises three types of computer workstations, data input workstations 12, a central server 14, and user workstations 16.

The data input workstations 12 are typically located in the vicinity of the angiographic clinical suites. The data input workstations 12 are used to input image data, diagrams and text describing angiographic procedures performed on the patients. The central server workstation 14 receives the diagnostic information from the input workstations 12 and stores the information in a database. The end user workstations 16 are remote computers and access the central server 14 via the Internet to retrieve a patient's angiographic file.

Preferably, the data input workstations 12 are capable of accessing angiographic studies recorded in the well-known DICOM (Digital Imaging and Communications Medicine) format. The DICOM format images may then be converted to any other format, such as MPEG, and transmitted to the central server 14. The workstations 12 are equipped with a facility to extract subsets of frames from selected cine runs. The facility is preferably implemented in computer software and allows the user to view an angiogram cine run and decide whether a subset of frames should be extracted. The viewing controls in the extraction facility are implemented to include STOP, PAUSE, and PLAY and similar functions, like those found on a CD player. The user provides an estimate of the first and last frames of the subset to be extracted from the original cine run. This estimate is then refined by a last to first frame motion correction algorithm according to another aspect of the invention as described in more detail below. The computer software preferably includes the capability for viewing the subset of frames played as a continuous loop before and after motion correction. Preferably, the input workstations 12 are equipped with authentication software for authorizing and allowing a user to send angiographic information to the central server 14.

According to another aspect, the input workstation includes a facility for generating a reporting page. The reporting page comprises a template diagram of the coronary anatomy showing the left ventricle and both the left and right coronary arteries and is annotated by the user. In addition, the user is given the ability to edit the diagram to remove or add features if the template does not adequately describe the anatomy of the case for the patient under review.

The data input workstations 12 preferably also include computer software for verifying whether the user has completed the extraction and reporting steps and then the information is appropriately packaged in a file for transmission to the central server 14. In the preferred embodiment, the packaged files are typically transmitted over a phone line via a modem or using a dedicated network connection to the central server 14 when the system is idle. Alternatively, the packaged files may be archived onto a portable storage medium (e.g. magnetic tape) and transported to the physical location where the central server 14 resides.

The central server 14 comprises one or more workstations connected to the Internet. A multiple workstation arrangement allows the functionality of a server to be distributed over several machines which as will be appreciated by those skilled in the art results in certain advantages. The central server 14 handles the arrival of new files from input workstations 12 as well as requests for angiographic studies made by authenticated users in remote location over the Internet. The central server 14 is implemented to include an input file processing module 22, a database server module 24 to store the files, a dynamic HTML (Hyper Text Markup Language) page generator module 26 and a web server module 28. The dynamic HTML generator module 26 generates HTML web pages for a patient's case in response to a request from a user workstation 16. The web server module 28 makes the HTML web pages available to the user workstations 16 via the Internet.

The input file processing module 22 processes the incoming files transmitted by the workstations 12. When a data file arrives from an input workstation 12, the input file processing module 22 performs a sanity check on the data file to ensure that the data is not truncated or corrupted. The input file processing module 22 creates an entry in the database which contains references to the image files and reporting information so that the information can be retrieved later. The implementation details of the input file processing module 22 together with the database server 24, dynamic HTML page generator 26 and web server 28 modules are within the understanding and skill of one skilled in the art.

The central server 14 also preferably includes a security interface. The security interface comprises a list of valid user identification codes. An end user must have been assigned one of the valid identification codes in order to gain full access to the central server 14. An authentication code is given to patients following their procedure. Physicians obtain authentication codes by signing up for the web service. There are three classes of end users. Unauthenticated: the users have declined to identify themselves and can only access some educational resources on the site. Authenticated patients: these authenticated users can in addition view results of their exam. Authenticated physicians: these authenticated users can in addition access studies for all patients under their care.

When an authenticated user (i.e. user workstation 16) requests an angiographic study, the references to the images and report are retrieved by the database server 24 from the database and the HTML page generator 26 creates an HTML document which presents the angiogram cine run or movie loops and reporting diagram for the end user. The web server 28 delivers the HTML page to the end user workstation 16.

The end user workstation 10 is implemented to run a web browser and a movie player. Through the Internet (i.e. World Wide Web) the user workstation 16 connects to the URL (Universal Resource Locator), i.e. web site, for the central server 14. To gain access, an authentication key is provided from the user workstation 16. If the key is valid the user is given privileges that are commensurate with their user class. Once the key is validated, the user workstation 16 is free to access the angiogram cine runs, cardiac diagram and other patient information. The web browser on the user workstation 16 is preferably configured to start the movie player when the angiogram cine run received from the central server 14. The format utilized for the movie player to transmit images to the user workstation 16 in the present embodiment is the known MPEG standard. However, other compression or encoding schemes such as wavelet encoding which offer better data compression could be utilized as movie players supporting these standards or formats become more widely available and the standards using these compression or encoding schemes become widely accepted.

According to another aspect of the present invention, there is provided a process for generating angiogram cine runs or movie loops which can be played continuously in one direction without the problem of image mis-registration between the last and first image frames. As will be described in more detail, the process according to the present invention includes a modified version of the cross correlation operation known as normalized cross correlation (NCC). The normalization operation reduces the likelihood of registering the wrong feature in the angiogram image. If an image contains a feature having a very strong signal that is an imperfect match to the feature found in the template and a second feature that matches the template feature more closely, the peak value of the correlation operation can be bigger for the imperfect match because that feature has more power. The normalization solves this problem by restricting the NCC so $C(u,v) \in [-1.0, 1.0]$ with a value of 1.0 indicating a perfect match with the template within a signal scaling factor and signal offset. Preferably, the normalization utilized in the process is optimized using known techniques such as those by J. P. Lewis in "Fast Template Matching" (1995).

Figure 2:
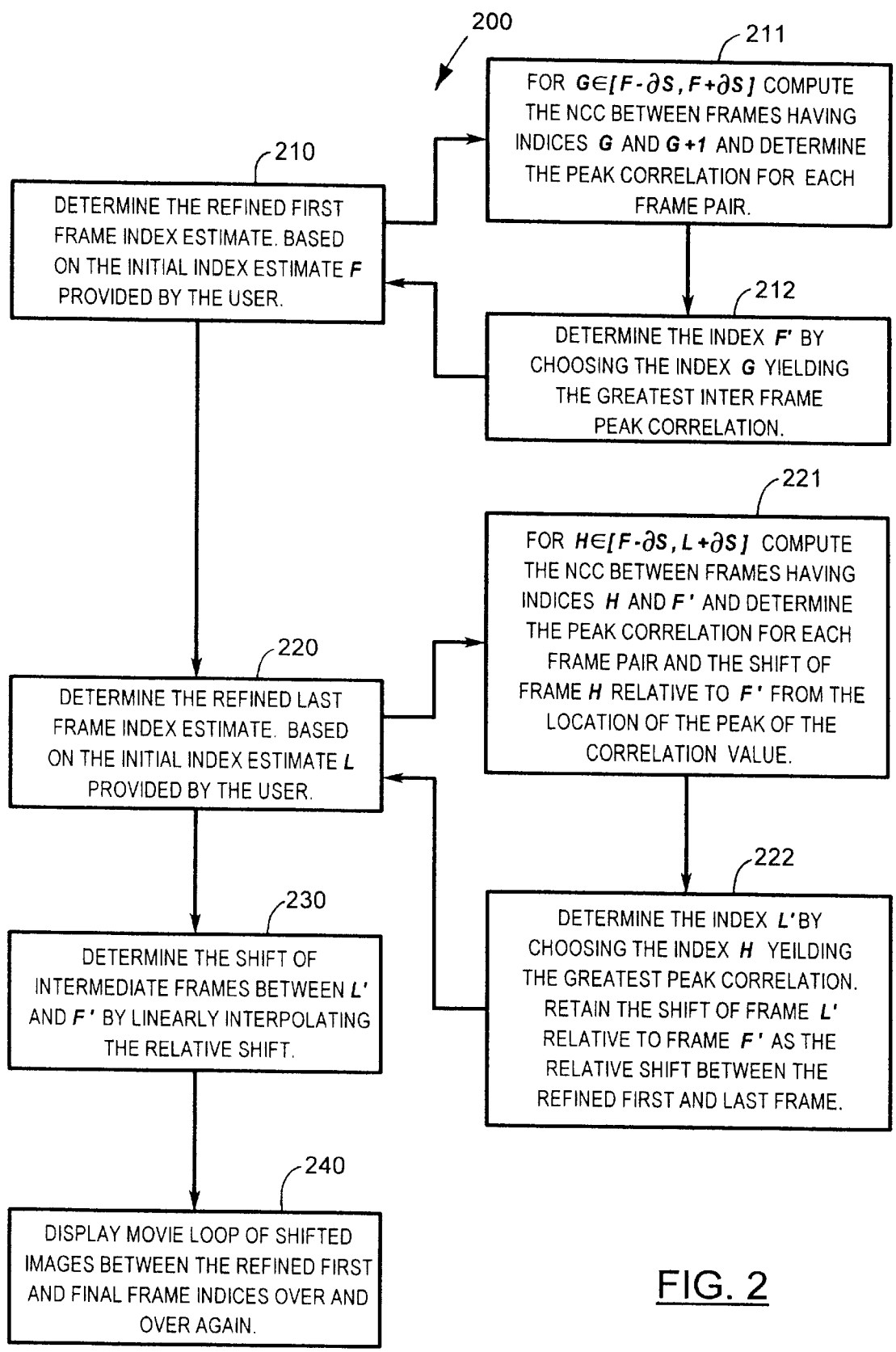
FIG. 2 is a flowchart which shows a process for generating an angiogram cine loop according to another aspect of the present invention.

Reference is made to FIG. 2 which shows in more detail a last-to-first frame correction process according to the present invention. The last-to-first process is indicated generally by reference 200. The first step (Block 210) involves refining the first frame selection. (It is assumed that the user can provide approximate estimates of the first frame index number, F, and last frame index number L, and that these frames both correspond approximately to end diastole.) The process 200 allows the choice of the exact first and last frame to be refined within a $\delta S$ frame neighbourhood about the user selected first and last frame indices. The peak value of the NCC between a template, $T_G$, extracted from the image of the Gth frame, $I_H$, and an image of the Hth frame, is defined as $$C_{TG,IH} = \underset{x,y,o}{\text{Max}} C(x, y, o).$$

In other words, the normalized correlation coefficient $C(x, y, \theta)$ is computed for a range of shift values (x,y) and rotation angles $\theta$ of the template image. Since it is important to remove the effects of bulk motion, the extraction of the template from an image may in most instances be done automatically by choosing a central region of the image which includes up to 50% of the frame.

The best shift (x,y) and rotation angle $\theta$ are defined as the values of x, y, and, $\theta$, for which the peak value of the NCC occurs. The peak value of the NCC is used as an indicator of the similarity between successive image frames and the shift and rotation values as are used as measures of motion of the image relative to the template. The values are used to perform image registration of the features of interest (arteries or ventricle) on subsequent frames.

Given the user provided first frame index F, the process 200 computes the peak NCC values, $C_{TG, IG+1}$, between the template extracted from the image having a frame index value G and the image having a frame index value of G+1 for $G \in [F-\delta S, F+\delta S)$ (Block 211). The index value F' yielding the greatest of all of the $2\delta S$ computed peak NCC values is retained as the refined first frame index as indicated in Block 212.

Next the final frame is determined in step 220 as shown in FIG. 2. According to the process 200, the final frame is determined by selecting a frame which most closely resembles the refined starting frame from frames within a δS frame neighbourhood about the user selected end frame index L. In other words, given the template $T_{F'}$ extracted from the central region of the refined starting frame $I_{F'}$, determined previously in Block 212, the peak value of NCC coefficients between the template from F'th frame and the image from the Hth frame, $C_{F',H}$, His calculated for H ∈ [L-δS,L+δS] as indicated in Block 221. The frame L' yielding the maximum peak correlation value is retained as the final frame relative to the first frame in the sequence as indicated in Block 222. The best shift $(X_{L'}/Y_{L'})$ of the final frame is used to determine the shift for all intermediate frames by doing linear interpolation such that the shift for an intermediate frame $(x_A, y_A)$ where F'≧A≧L' is given by the following equation:

$$(xA, yA) = (A - F') \frac{(x_{L'} y_{L'})}{L' - F'} \quad (1)$$

Using this technique, the images are shifted gradually so that the mis-registration between the last frame and the first frame is distributed over the entire movie loop. In addition, masking of the frames is performed to hide motion of the edges of the frame.

The process 200 may also include an operation for the computation of the optimum rotation angle for the last frame relative to the first frame. This information is used to obtain a better match between the template and the target image as part of the NCC computation. It will be appreciated that the rotation angle is not typically used to rotate the displayed frames relative to one another as this transformation may sometimes be disturbing to the user viewing the processed movie loop.

After the frames have been processed as described above, the frames in the angiogram cine run or movie loop can be run or played continuously in either a forward direction or a reverse direction without any noticeable jumps or abrupt motion between the last image frame and the first image frame. This is depicted as step 230 in FIG. 2.

In the case of an angiography system generating 15 frames/second, it has been found that a value of δS equal to 4 yields good results. Larger values increase computation time without noticeable benefits. The range of angles over which the template is rotated for the purpose of the peak NCC calculation can be limited to ±1.0 degrees and computed at half degree intervals. Because image registration is used to reduce abrupt motion and not for the purpose of a more demanding task like image fusion, it has also been found that the correlation calculation can be performed on down sampled versions of the frames to speed up calculations and the resulting shifts re-scaled.

It has also been found that the use of a template occupying 50% of the original frame area extracted from the centre of the image yields a good last to first frame correction in most instances. If the default template is not adequate, the user has the option of defining their own rectangular template by dragging the computer mouse over a region of interest. If ECG data synchronized with acquisition of the images is available, the choice of first and last frame can be more easily automated. The ECG data is then used to provide initial estimates of the first and last frames. The cine run is then refined according to the process 200.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for generating a movie loop from a series of image frames, said image frames being produced by an x-ray system and depicting the internal anatomy of a patient, said anatomy including a cyclical event, said method comprising the steps of:
    (a) selecting a plurality of image frames from said series, wherein said selected image frames include a first image frame, a last image frame and intermediate image frames, said first image frame and said last image frame depicting an equivalent phase in the cyclical event;
    (b) performing an image operation upon said last image frame to minimize the differences in a feature of interest between said last image frame and first image frame;
    (c) scaling and performing said image operation upon said intermediate image frames; and
    (d) forming a movie loop from said selected image frames.

2. The method as claimed in claim 1, wherein said step of selecting includes a first step of selecting as said first image frame an image frame exhibiting a minimal change with respect to an adjacent image frame.

3. The method as claimed in claim 1, wherein said step of selecting includes receiving an estimated first frame.

4. The method as claimed in claim 3, wherein said step of selecting includes a second step of selecting as said last image frame an image frame exhibiting a minimal change with respect to said first image frame.

5. The method as claimed in claim 4, wherein said step of selecting includes receiving an estimated last frame.

6. The method as claimed in claim 5, wherein said first step of selecting includes calculating a measure of similarity between adjacent image frames in a neighbourhood around said estimated first frame.

7. The method as claimed in claim 6, wherein said measure of similarity is invariant with respect to bulk movement between frames.

8. The method as claimed in claim 7, wherein said bulk movement includes translation, rotation and warping.

9. The method as claimed in claim 7, wherein said measure of similarity includes a correlation operation.

10. The method as claimed in claim 6, wherein said measure of similarity is invariant with respect to changes in brightness and contrast between frames.

11. The method as claimed in claim 5, wherein said second step of selecting includes calculating a measure of similarity between image frames in a neighborhood around said estimated last frame as compared to said first image frame.

12. The method as claimed in claim 11, wherein said measure of similarity is invariant with respect to bulk movement between frames.

13. The method as claimed in claim 12, wherein said bulk movement includes translation, rotation and warping.

14. The method as claimed in claim 12, wherein said measure of similarity includes a correlation operation.

15. The method as claimed in claim 11, wherein said measure of similarity is invariant with respect to changes in brightness and contrast between frames.

16. The method as claimed in claim 5, wherein said estimated first frame and said estimated last frame are derived from ECG data, said ECG data being synchronized with said sequence of image frames.

17. The method as claimed in claim 5, wherein said estimated first frame and said estimated last frame are selected by an operator.

18. The method as claimed in claim 1, wherein said cyclical event is a cardiac cycle.

19. The method as claimed in claim 18, wherein said equivalent phase is an end diastole.

20. The method as claimed in claim 18, wherein said equivalent phase is an end systole.

21. The method as claimed in claim 19, wherein said last image frame is an image frame an integral number of cycles of the cyclical event from said first image frame.

22. The method as claimed in claim 1, wherein said step of performing an image operation upon said last image frame includes selecting said image operation corresponding to a maximum measure of similarity between said last image frame and said first image frame.

23. The method as claimed in claim 22, wherein said image operation includes shifting said last image frame.

24. The method as claimed in claim 22, wherein said image operation includes rotating said last image frame.

25. The method as claimed in claim 22, wherein said image operation includes warping said last image frame.

26. The method as claimed in claim 1, wherein said step of scaling includes performing linear interpolation to distribute the effect of said image operation across said intermediate image frames.

27. The method as claimed in claim 26, wherein said image operation includes shifting said intermediate image frames.

28. The method as claimed in claim 26, wherein said image operation includes rotating said intermediate image frames.

29. The method as claimed in claim 26, wherein said image operation includes warping said intermediate image frames.

30. The method as claimed in claim 1, further including a step of enhancing said feature of interest in said selected image frames prior to said step of performing an image operation, said step of enhancing including applying a filtering operation.

31. The method as claimed in claim 1, further including a step of masking said selected image frames following said image operations to hide any motion appearing at the edges of said selected image frames.

32. A method for generating a movie loop from a series of image frames, said image frames being produced by an x-ray system and depicting the internal anatomy of a patient, said method comprising the steps of:
    (a) selecting a plurality of image frames from said series wherein said selected image frames define a sequence associated with said internal anatomy;
    (b) registering a first image frame and a last image frame in the selected image frames;
    (c) wherein said step of registering said last and said first image frames comprises minimizing differences in a feature of interest appearing in said first and said last image frames;
    (d) forming a movie loop from said selected image frames and said registered first and last image frames, wherein said movie loop includes intermediate image frames between said first and said last image frames, said intermediate image frames being compensated for differences in the appearance of said feature of interest in said last registered image frame and said first image frame;
    (e) wherein said step of registering said first and said last image frames comprises performing operations to minimize changes in the position of said feature of interest between said first and last image frames and in said intermediate image frames; and
    (f) wherein said operations includes a rotation operation and a translation operation of said feature of interest.

33. The method as claimed in claim 32, wherein said rotation and said translation operations are performed using pattern matching techniques.

34. A method for generating a movie loop from a series of image frames, said image frames being produced by an x-ray system and depicting the internal anatomy of a patient, said method comprising the steps of:
    (a) selecting a plurality of image frames from said series wherein said selected image frames define a sequence associated with said internal anatomy;
    (b) registering a first image frame and a last image frame in the selected image frames;
    (c) wherein said step of registering said last and said first image frames comprises minimizing differences in a feature of interest appearing in said first and said last image frames;
    (d) forming a movie loop from said selected image frames and said registered first and last image frames, wherein said movie loop includes intermediate image frames between said first and said last image frames, said intermediate image frames being compensated for differences in the appearance of said feature of interest in said last registered image frame and said first image frame;
    (e) wherein said step of registering said first and said last image frames comprises performing operations to minimize changes in the position of said feature of interest between said first and last image frames and in said intermediate image frames; and
    (f) enhancing said feature of interest in said selected image frames prior to said step of registering, said step of enhancing including applying a filtering operation.

35. A method for generating a movie loop from a series of image frames, said image frames being produced by an x-ray system and depicting the internal anatomy of a patient, said method comprising the steps of:
    (a) selecting a plurality of image frames from said series wherein said selected image frames define a sequence associated with said internal anatomy;
    (b) registering a first image frame and a last image frame in the selected image frames;
    (c) wherein said step of registering said last and said first image frames comprises minimizing differences in a feature of interest appearing in said first and said last image frames;
    (d) forming a movie loop from said selected image frames and said registered first and last image frames, wherein said movie loop includes intermediate image frames between said first and said last image frames, said intermediate image frames being compensated for differences in the appearance of said feature of interest in said last registered image frame and said first image frame;
    (e) wherein said step of registering said first and said last image frames comprises performing operations to minimize changes in the position of said feature of interest between said first and last image frames and in said intermediate image frames; and
    (f) masking said registered first and last image frames to hide any motion appearing at the edges of said image frames.

* * * * *